United States Patent [19]

Thompson

[11] Patent Number: 5,075,393
[45] Date of Patent: Dec. 24, 1991

[54] THICKENED MOULDING COMPOSITIONS

[75] Inventor: Stephen J. Thompson, Wellingborough, England

[73] Assignee: Scott Bader Company Limited, Wellingborough, England

[21] Appl. No.: 394,646

[22] Filed: Aug. 16, 1989

[30] Foreign Application Priority Data

Aug. 17, 1988 [GB] United Kingdom ............ 8819563.1

[51] Int. Cl.$^5$ ......................... C08F 20/20; C08L 67/03
[52] U.S. Cl. ..................................... 525/444; 523/527
[58] Field of Search ......................................... 525/444

[56] References Cited

U.S. PATENT DOCUMENTS

| | | | |
|---|---|---|---|
| 3,923,927 | 12/1975 | Miyaki | 260/861 |
| 3,959,209 | 5/1976 | Lake | 260/861 |
| 4,837,270 | 6/1989 | Kraemer | 525/444 |
| 4,895,895 | 1/1990 | Osborne et al. | 523/523 |

FOREIGN PATENT DOCUMENTS

| | | |
|---|---|---|
| 0083837 | 7/1983 | European Pat. Off. . |
| 0271970 | 6/1988 | European Pat. Off. . |
| 8906258 | 7/1989 | PCT Int'l Appl. . |
| 1318517 | 5/1973 | United Kingdom . |
| 1319243 | 6/1973 | United Kingdom . |
| 1370138 | 10/1974 | United Kingdom . |

OTHER PUBLICATIONS

Kramer, "Biological and Synthetic Polymer Networks," pp. 321–334, Jun. 1988, Elsevier Applied Science, N.Y.

*Primary Examiner*—Paul R. Michl
*Assistant Examiner*—Yong S. Lee
*Attorney, Agent, or Firm*—Cushman, Darby & Cushman

[57] ABSTRACT

A moulding composition comprises a fibrous reinforcement, an ethylenically unsaturated, essentially amorphous, polymer, a cross-linking agent copolymerizable therewith and, as a thickener and low profile/shrinkage control agent, a crystalline saturated polyester which (a) has a number average molecular weight of from 700–10,000 inclusive, (b) has a melting point within a range of from 50°–140° C. inclusive, and (c) is soluble in an equal weight of the cross-linking agent at 100° C. and yet insoluble therein at 30° C.

15 Claims, No Drawings

THICKENED MOULDING COMPOSITIONS

FIELD OF THE INVENTION

This invention relates to thickened reinforced unsaturated resin compositions suitable for moulding.

BACKGROUND OF THE INVENTION

Moulding compositions based on unsaturated polyester resins normally consist of resin, filler, catalyst for curing, internal mould release agent and reinforcing fibers The original compositions were in the form of a putty—known as dough moulding compounds (DMC). Following the discovery that the incorporation of certain Group II metal oxides and hydroxides such as CaO and Ca(OH)$_2$ caused thickening of the resin system, compositions which were tack free, known as bulk moulding compounds (BMC), sheet moulding compounds (SMC) and thick moulding compounds (TMC) became available. BMC was originally based on chopped glass fibres whilst SMC and TMC were based on chopped strand mat and cut rovings respectively. In SMC the resin was applied to the chopped strand mat and, after compacting, was rolled up between cover sheets of, for example, polyethylene. After 3-7 days the polyethylene could be readily peeled off to yield a tack free sheet, weighing typically from 3-8, preferably from 4-8, more preferably from 5-6 Kg/m$^2$, which could be loaded into a heated press and moulded at temperatures of 120°-160° C. under pressure. In TMC, which allows for three dimensional orientation of the fibres, the cut rovings were ordered in parallel strands and fed together with resin paste material, for example, by a pump, into the nip of two contrarotating rollers. The compound was then passed through fast running take-off rollers onto a carrier film of, for example, nylon which, together with a cover film, was fed on to a conveyor belt. This resulted in a sheet weighing, typically, from 5-40, for example, from 6-20, or from 20-40 Kg/m$^2$, which was cut, for example, by hand and laid, often as a single piece, in a mould. A typical machine for producing TMC is disclosed in US-A-3932980, and a comparison of SMC and TMC is made by M Yamada et al, 33rd Annual Technical Conference, 1978 Reinforced Plastics/Composites Institute, The Society of the Plastics Industry, Inc., Section 4-8 pages 1-6.

The thickening of resin by Group II metal oxides/hydroxides is due to a combination of the formation of covalent bonds and co-ordinate bonds. It is difficult to control. Ideally the impregnation mix should be low in viscosity to allow good impregnation of the fibers, should thicken rapidly after impregnation and should reach a maximum viscosity which does not change on storage. Such behaviour is represented by a graph of viscosity vs. time (days) marked "IDEAL" in the accompanying drawing. What actually happens when using such metal oxides/hydroxides is also shown in another graph of the accompanying drawing marked "TYPICAL SMC". The rate and extent of thickening depends on the resin used to such an extent that not only the normal resin parameters have to be controlled (i.e. acid value and viscosity) but also hydroxyl value and molecular weight distribution. In addition, since the metal oxide/hydroxide is influenced by the presence of moisture and carbon dioxide in the atmosphere, special storage precautions are required to prevent even further variations in maturation on storage.

It is also known to make other types of thermosetting resins, e.g. vinyl esters, into BMCs and SMCs, but it has previously been necessary to make special modifications to the resins to allow the thickening reaction with Group II oxides and hydroxides to occur, this being because the standard vinyl ester resins often have very low acid values.

All of the above-mentioned compositions were highly filled, but if unfilled systems were required the filler was omitted and a solvent based resin was pre-impregnated on to reinforcing fibres, the solvent removed and the resulting tacky prepreg rolled up between sheets of film. However, the sheets of film were difficult to remove from these prepregs due to the tackiness of the pre-impregnated fibre.

One method of overcoming the disadvantages with unfilled pre-impregnated reinforcements is described in GB-A-1319243 and GB-A-1318517. Examples are given in these patents of polyester resins which when blended with styrene monomer are solid and can be used to impregnate reinforcing fibres when molten.

In our EP-A-0083837, we disclosed the use of unsaturated crystalline resins to thicken both filled and unfilled ethylenically unsaturated polymer moulding compositions based on standard resins thus eliminating the need for special resins made for moulding compositions. Because the thickening mechanism is a physical one a number of other advantages occur:
(i) no metal oxide/hydroxide is required and hence, in contrast to when a metal oxide is used, no special storage precautions are required to prevent further variations in maturing,
(ii) indeed, no maturation period is required, the compositions being ready for moulding as soon as they have cooled and
(iii) storage stability is much improved.

In order that fully cured mouldings should have an acceptable surface finish i.e. be hard, without ripples and free of fibre pattern, a low profile/shrinkage control additive is included in the compound formulation. Such additives are thermoplastic high molecular weight polymers, for example polyethylenes, acrylic co-polymers, polycaprolactones, polyvinyl acetates and polystyrenes (optionally modified to give elastomeric properties by for example incorporating butadiene units).

GB-A-1370138 describes a composition suitable for use in compression moulding and comprising an unsaturated polyester and, as low profile additive a saturated polyester derived from (a) adipic acid and 1,6-hexanediol, ethylene glycol, 1,10-decanediol, diethylene glycol or a specified ester diol, (b) azelaic acid and ethylene glycol or 1,6-hexanediol, or (c) phthalic anhydride and 1,10-decanediol. Such polyesters are soluble in styrene at room temperature and function only as low profile additives, not thickeners. Accordingly, when it is desired to thicken the composition a conventional inorganic thickener as described above is required.

EP-A-0271970 describes a modification of the above-mentioned compositions of EP-A-0083837 in which the crystalline unsaturated polyesters used as thickeners are those made by the reaction of two or more symmetrical glycols such as 1,6-hexanediol, ethylene glycol, neopentyl glycol or 1,4-cyclohexane dimethanol, with an unsaturated dicarboxylic acid, preferably fumaric acid. The unsaturated crystalline polyester preferably has a molecular weight per double bond of no more than about 210 and a melting point within a range of about 50°-115° C. This modification enabled the low profile/- shrinkage control additive additionally present to become more effective.

SUMMARY OF THE INVENTION

It was surprising to find out that saturated generally crystalline polyesters of relatively low molecular weight and having the characteristics given below can, at one and the same time, function both as thickeners and low profile/shrinkage control agents within an unsaturated resin moulding composition.

A moulding composition in accordance with the invention comprises a fibrous reinforcement, an ethylenically unsaturated polymer, a crosslinking agent, usually a monomer, copolymerisable therewith and, as a thickener and low profile/shrinkage control agent, a saturated polyester having all of the features (a), (b) and (c) given below.

The crystalline saturated polyesters have all three of the following characteristics as determined by the test methods detailed in Appendix 1:
a) They have a number average molecular weight within the range of about 700–10,000; more preferably about 800–4,000.
b) They have a melting point within the range of about 50°–140° C.; more preferably about 60°–120° C.
c) In an equal weight of styrene, they are soluble at 100° C., yet insoluble at 30° C.

Thus, whatever the crosslinking agent actually used in a given moulding composition (and styrene is preferred), the crystalline saturated polyester must have the solubility characteristics set out in (c) above in styrene specifically. Although we are uncertain as to the reasons for this, we find surprisingly that such crystalline polyesters exhibit the desired dual role of thickening the composition and improving the surface characteristics of products moulded therefrom. Indeed, we find that if the saturated polyester is insoluble in styrene at 100° C. then it is effective only as a filler and not as a thickener or a low profile/shrinkage control agent, whereas even if it is soluble in styrene at 100° C. but is not thrown out of solution on cooling to 30° C. it cannot thicken.

If the saturated polyester has a molecular weight below about 700, it is difficult to obtain a solid crystalline resin, the melting point drops and the material becomes soluble in styrene at 30° C. On the other hand, saturated polyesters having a molecular weight above about 4000 tend to become glassy, i.e. amorphous, rather than crystalline, to have too high a melting point and to be difficult to dissolve in styrene at 100° C.

If the melting point of the saturated polyester is less than about 50° C. the resin tends to be soluble in styrene at 30° C. and/or to allow a liquid phase separation to result. On the other hand, if the melting point is higher than about 140° C. gelation tends to occur during processing, i.e. compounding of the composition.

For ease of processing, the saturated polyester should have a melt viscosity within the range 1·p (0.1 Pa.s) at 125° C.–40 p (4 Pa.s) at 150° C. (see Appendix 1).

The saturated polyester is generally crystalline at ambient temperature and pressure; in other words it is crystalline at least to some extent such that it is optically white, off-white, opaque or opalescent (as compared with amorphous (glassy) polyesters which are transparent or translucent), and produces a distinct endothermic peak on measurement of its melting point by differential thermal analysis (DTA) (compare amorphous polymers which exhibit a second order transition curve).

The saturated polyester is one which is free from ethylenic (alkene) or acetylenic (alkyne) unsaturation.

The crystalline saturated polyester can be made by reacting one or more symmetrical glycols with one or more saturated carboxylic acids, the dimethyl esters thereof or their anhydrides. In an alternative reaction by which the saturated polyester can be made, one or more (typically two) symmetrical glycols together with an asymmetric glycol are reacted with one or more (typically two) saturated dicarboxylic acids or reactive derivatives thereof such as their dimethyl ester(s) or their anhydride(s).

Typically, the glycol component is derived from at least one of ethylene glycol, propylene glycol, 1,4-butanediol, 1,6-hexanediol, diethylene glycol and 1,4-cyclohexanedimethanol.

Typically, the acid component is derived from at least one of adipic acid, succinic acid, azelaic acid, terephthalic acid, isophthalic acid and reactive derivatives thereof.

Preferably, at least one of the acid and glycol components is derived from two acids or glycols respectively.

The acid and glycol components are selected and the degree of reaction controlled so that the crystalline saturated polyester has all of the features (a)–(c) described above.

The crystalline saturated polyester may be added as a hot solution of the polyester in the monomer copolymerisable with the unsaturated polymer, but is preferably added in solid form.

Expressed as a proportion of the total weight of resin, i.e. unsaturated polymer, copolymerisable monomer and crystalline saturated polyester, the crystalline saturated polyester is preferably present in an amount of from 10–50%; and more preferably from 15–35%.

The total weight of resin includes any monomer in which the unsaturated polymer is dissolved or which is added during formulation of the mixture of unsaturated polymer, crystalline polyester and monomer and includes any monomer, for example, that which may be used as a solvent for any agent which may be added later such as an additional low profile/shrinkage control or thickening agent. However, the total weight of resin does not include the weight of any additional such agent itself.

If the amount of crystalline saturated polyester, on the above basis, is less than about 10% by weight, the polyester may prove ineffectual, whereas above about 50% it may cause excessive thickening.

For a given saturated polyester within a given composition, optimisation of one of the functions, for example thickening, does not automatically optimise the other. Hence it is sometimes desirable to supplement one of the functions by the addition of reduced (c.f. conventional) levels of materials known for the purpose). An example would be the addition, in an amount of up to, say 5%, preferably up to 2.5%, especially 1–2.5% by weight of the total weight of the composition, of an unsaturated crystalline polyester to boost thickening or of a polyvinyl acetate to enhance the low profile/shrinkage control function.

Shrinkage control agents and low profile agents are materials added to a moulding composition so as to reduce the linear dimensional changes on curing the composition in a mould. According to the requirements of the specific moulding compound these may be used to reduce shrinkage on moulding to a low level, to virtually zero, or indeed to produce a small apparent expansion. The term "Low Profile" is used when there is a significant improvement in the quality of the surface finish of the moulded article, especially improved flatness, lower degrees of short and long term waviness, and enhanced smoothness and gloss. The control of moulding shrinkage has the additional benefit of generally reducing internal stress in the moulding, with a consequent reduction in distortion and warpage in the moulded article on removal from the mould and subsequent cooling. Since shrinkage control prevents surface cracking and other defects it is clear that the respective roles of low profile and shrinkage control agents are often inseparable from one another.

The unsaturated polymers to which the thickeners are added may be any of those present in standard resins.

The unsaturated polymers may be, for example, unsaturated polyesters such as those made by reaction of one or more glycols with an unsaturated dicarboxylic acid or its anhydride or with a mixture of the unsaturated acid or its anhydride with a saturated dicarboxylic acid or its anhydride. Optionally, minor amounts of alcohols, polyols, monobasic or polybasic acids may be incorporated in the reaction mixtures from which the unsaturated polyesters are made, which reaction mixtures may also include dicyclopentadiene to modify the polyesters.

Other unsaturated polymers which can be made into resin compositions in accordance with the invention using these techniques are vinyl ester polymers (which may be prepared by reaction of acrylic or methacrylic acid with epoxy resins) and urethane acrylate polymers, especially acrylate terminated polyurethanes.

The unsaturated polymers to which the saturated crystalline polyesters are added are essentially amorphous.

The amorphous polymer may be dissolved in at least a portion of the crosslinking agent copolymerisable therewith prior to its incorporation in the composition so that the polymer is then incorporated in the composition as a liquid resin.

The crosslinking agent copolymerisable with the ethylenically unsaturated amorphous polymer may be any suitable vinyl monomer such as styrene, vinyl toluene, p-methyl styrene, chlorostyrene, t-butyl styrene, methyl methacrylate, a glycol diacrylate or diallyl phthalate.

The crosslinking agent is preferably present in an amount of from about 25-50%, more preferably from 35-50%, inclusive by weight of the total resin content, i.e. the total weight of amorphous and crystalline polyesters and crosslinking agent.

If the monomer content is less than about 25% by weight on the above basis the mixture tends to be too thick. Furthermore, an insufficient number of crosslinks may be provided so that the resin may be difficult to cure. Moreover, the efficiency of any (optional) additional low shrink/profile additive may be impaired.

If the monomer content is higher than about 50% by weight on the above basis, the viscosity may be too low and both the mechanical properties and heat resistance of resultant mouldings may be degraded.

The abovementioned monomer content includes any monomer in which the unsaturated polymer is dissolved or which is added during formulation of the mixture of unsaturated polymer, crystalline polyester and monomer and includes any monomer, for example, that which may be used as a solvent for any agent which may be added later such as an additional low profile/shrinkage control or thickening agent. However, when assessing the amount of monomer by weight of total resin, the weight of such additional agent is excluded.

The resin composition may be unfilled or alternatively may contain additionally a filler, which can be selected from, for example, natural or precipitated calcium carbonates, clays, silica, talc, mica and alumina hydrate, which filler may be present in large amounts, especially in a TMC. The amount of filler may be from 0 to 70% inclusive, preferably up to about 55%, by weight of the total weight of the composition.

The composition is reinforced either by admixing a reinforcement, preferably reinforcing fibres, with the other components of the composition or by impregnating it into a fabric made from reinforcement fibres, so providing a preprep. Whilst the reinforcing fibres will normally be glass fibres they may be substituted wholly or in part by synthetic fibres such as carbon fibres, KEVLAR® or similar aramid fibres, polyethylene terephthalate fibres, natural fibres e.g. jute, or whisker or microfibre reinforcement.

Moulding compositions which are unfilled usually contain high levels of reinforcement, typically at least 50%, especially at least 60%, by weight of the total composition and contain lower levels of monomer, typically 25-35%, especially 25-30%, by weight of the total weight of resin.

Particularly preferred compositions are sheet moulding compounds (SMC) and thick moulding compounds (TMC).

Pigments may be incorporated in the compositions if required.

The compositions may be cured using free radical catalysts such as organic peroxy compounds, e.g. t-butyl perbenzoate or perketals but unfilled compositions may be cured using light as described in our EP-B-0025359.

Typical mould release agents which may be additionally incorporated in these compositions are zinc stearate and ZELEC® UN, an unneutralized alcohol ester of orthophosphoric acid, commercially available from Du Pont Company (United Kingdom) Limited.

A filled moulding composition embodying the invention suitable as SMC may be prepared by mixing together the resin components (i.e. amorphous and crystalline polyesters and crosslinking agent), filler, mould release agent and catalyst at room temperature to form a premix, heating the premix to a temperature of from about 55°-65° C. and impregnating a fibrous reinforcement with the heated mix.

For such a composition the amount of filler present therein is preferably no more than about 70% by weight of the premix. If the filler content is higher, then the premix may be too thick to impregnate efficiently the reinforcement. In addition there may be an insufficient proportion of the resin components to coat all of the filler particles; such coating is necessary to avoid degradation of the mechanical properties of a product moulded from the composition.

DESCRIPTION OF THE PREFERRED EMBODIMENTS

Embodiments of the invention will now be described in more detail with reference to the following Examples.

EXAMPLE X (Amorphous polyester X present in a thickened composition embodying the invention)

A standard amorphous polyester X was made and dissolved in styrene monomer to provide a resin (sometimes referred to hereinafter as "amorphous resin").

X was made from propylene glycol and a mixture of maleic anhydride and isophthalic acid of a molar ratio of 3.7:1. A 6% glycol excess was used. The reaction proceeded at 180° C. until an acid value of 23 mg/g KOH was reached. The polyester was then cooled, and then blended with styrene to give a resin solution of 68% solids and a viscosity of 18 p (1.8 Pa.s) at 25° C.

EXAMPLES A-J (Crystalline Polyesters)

column before passing to a condenser. The typical glycol excess was 3-6%.

To minimise glycol loss, the heat input of the reaction was controlled so that the still head temperature never exceeded 102° C. To maintain the still head temperature to near its permitted maximum, the reaction temperature was allowed to steadily rise to a maximum of 240° C. (200° C. for the unsaturated resin of the comparative Example I).

On reaching the required melt viscosity the resin was allowed to cool to approximately 150° C. before being dropped into a Melinex TM (ICI) lined tray where it solidified. Prior to leaving the reactor Example I was blended with 100 parts per million by weight of hydroquinone, a polymerization inhibitor.

The formulation and properties of the crystalline polyesters A-J are given in Table 1.

TABLE 1

| CRYSTALLINE POLYESTERS - COMPOSITION AND PROPERTIES | | | | | | | | | | |
|---|---|---|---|---|---|---|---|---|---|---|
| | MOLE RATIOS | | | | | | | | | |
| | A | B | C | D | E | F | G | H | I | J |
| Ethylene Glycol | | 10.0 | 6.0 | | | | | | 1.0 | |
| Propylene Glycol | | | | 1.0 | | | | | | |
| 1,4-Butane Diol | | | | | 3.0 | 2.0 | 10.0 | | | 1.0 |
| 1,6-Hexane Diol | 2.0 | | | 2.0 | | | | | 3.0 | |
| Diethylene Glycol | 1.0 | | | | | | | | | |
| 1,4-Cyclohexane Dimethanol | | | | | | | | 1.0 | | |
| Adipic Acid | | 1.0 | 1.0 | | | | | 1.0 | | 1.0 |
| Succinic Anhydride | | 9.0 | 5.0 | | 2.0 | | 9.0 | | | |
| Azelaic Acid | | | | | 1.0 | | 1.0 | | | |
| Terephthalic Acid | 3.0 | | | 3.0 | | | | | | |
| Dimethyl Isophthalate | | | | | | 1.0 | | | | |
| Dimethyl Terephthalate | | | | | | 1.0 | | | | |
| Fumaric Acid | | | | | | | | | 4.0 | |
| Molecular Weight Mn | 1,966 | 1,680 | 1,975 | 1,712 | 2,603 | 1,814 | 3,124 | 977 | 2,300 | 2,328 |
| Melting Point °C. | 107.0 | 87.5 | 79.0 | 109.0 | 81.0 | 133.0 | 105.0 | 98.0 | 91.0 | 60.0 |
| Melt Viscosity p** @ 125° C. | 27.0 | 2.1 | 2.5 | 28.0 | 5.1 | 11.0* | 7.2 | 1.6 | 24.0 | 3.5 |
| Styrene Solubility Test | PASS | PASS | PASS | PASS | PASS | PASS | PASS | PASS | PASS | FAIL |

*@ 150° C.
**0.1 Pa.s.

Examples A-H are saturated polyesters; A-F represent combinations of properties that will function as the total thickener and low profile additive needed in the "standard compound formulation".

Example G illustrates a saturated crystalline polyester which thickened well but the low profile action needed augmenting with polyvinyl acetate.

Example H is the converse of G i.e. exhibited good low profile activity but the thickening required enhancing with unsaturated crystalline polyester.

Example I is a comparative example showing that an unsaturated crystalline polyester thickens but has no low profile effect.

Example J is also comparative showing that a saturated crystalline polyester which failed the styrene solubility test (see Appendix 1) had low profile properties but did not thicken.

Each of the crystalline polyesters of Table 1 was prepared by reacting together the molar ratios of acid(s) and glycol(s) specified, in a stirred heated reactor, in an inert nitrogen atmosphere. A slight but variable (according to the glycol being reacted) excess of glycol was used to compensate for losses incurred during the reaction. Losses were due to degradation (e.g. conversion of 1,4 butane diol to tetrahydrofuran) and removal with the water of esterification by atomspheric distillation. All vapours passed through a packed fractionating

EXAMPLES 1-10

Formulation of Compositions

| Standard Compound Formulation | |
|---|---|
| Amorphous Resin of Example X | 150.00 g |
| [Amorphous Polyester X (102 g) + styrene (48 g)] | |
| Styrene | 60.00 g |
| Saturated crystalline polyester | 40.00 g |
| Filler | 400.00 g |
| Zinc stearate | 15.00 g |
| Catalyst: Trigonox ™ 29B50 (a peroxy catalyst, 1,1-di-tert butyl-peroxy 3,3,5-trimethyl cyclohexane commercially available from Akzo Chemie) | 3.75 g |

This premix was heated to 57°-63° C. and used to form a sheet moulding compound by impregnating two layers of 450 g/sqm chopped strand glass mat to give a glass content of 20.7%. For ease of handling, the SMC was faced with nylon film.

The cooled SMC was stripped of the nylon and was moulded for 3 minutes at 145° C. under an applied pressure of 1200 psi (8.3 MPa) to give a cured plate nominally 102 by 267.56 mm and of 3.2 mm thickness. Linear dimensional change was determined by measurement at 25° C., negative (−) values indicating shrinkage and positive (+) values indicating expansion (see Table 2 below). The difference in length between that of the mould and that of the moulding was expressed as parts per thousand of the length of the mould.

EXAMPLE VARIATIONS AND COMMENTS

Two fillers were used in the formulations: Calcium carbonate, sold as Millicarb TM and manufactured by Pluss-Staufer AG.

Alumina Trihydrate sold as Trihyde TM or Martinal TM manufactured by Martinswerk GmbH. A blend of the grades ON 310 and OL 104 in a 2:1 ratio by weight was compounded.

EXAMPLES 1–6

| Example | Crystalline Polyester | Filler |
|---|---|---|
| 1 | E | Calcium Carbonate |
| 2 | D | Calcium Carbonate |
| 3 (Best Method) | A | Calcium Carbonate |
| 4 | C | Calcium Caronbate |
| 5 | D | Alumina Trihydrate |
| 6 | F | Alumina Trihydrate |

All thickened on cooling to give an easily handled, slightly tacky sheet from which the nylon films peeled readily, prior to moulding.

EXAMPLE 7

The thickening behaviour of saturated crystalline polyester H needed augmenting with a minor addition of unsaturated crystalline polyester I.

| | |
|---|---|
| Amorphous Resin of Example X | 100.00 g |
| [Amorphous Polyester X (68 g) + styrene (32 g)] | |
| Styrene | 90.00 g |
| Saturated crystalline polyester H | 40.00 g |
| Unsaturated crystalline polyester I | 20.00 g |
| Calcium Carbonate | 400.00 g |
| Zinc Stearate | 15.00 g |
| Trigonox 29B50 | 3.75 g |

Moulding compound characteristics as for Example 1–6.

EXAMPLE 8

Saturated crystalline polyester G thickened so vigorously that the amount in the formulation had to be reduced.

Consequently the low profile action needed augmenting with a minor, less than half the normal, addition of rystic TM 777, a 40% by weight solution of a polyvinyl acetate in styrene (commercially available from Scott Bader Company Limited).

| | |
|---|---|
| Amorphous Resin of Example X | 150.00 g |
| [Amorphous Polyester X (102 g) + styrene (48 g)] | |
| Styrene | 30.00 g |
| Saturated crystalline polyester G | 20.00 g |
| Crystic TM 777 | 50.00 g |
| Calcium Carbonate | 400.00 g |
| Zinc Stearate | 15.00 g |
| Trigonox 29B50 | 3.75 g |

Moulding compound characteristics as for Examples 1–7.

EXAMPLE 9

The formulation was standard, with calcium carbonate filler and the saturated crystalline polyester J, the one which failed the styrene solubility test.

A soft, sticky, unthickened compound was produced which had to be scraped from the carrier film in order to mould it.

EXAMPLE 10

The formulation was standard, with calcium carbonate filler and the unsaturated crystalline polyester I.

Moulding compound characteristics as for Examples 1–8.

The properties and comments attributed to the mouldings produced from the Examples 1–10 are to be found in Table 2.

TABLE 2

Mouldings from Compounded Resin Mixtures

| Example | Crystalline Polyester | Linear Dimensional Change Parts/1000 | Surface Quality Assessment | Comment |
|---|---|---|---|---|
| 1 | E | +0.47 | 9 | Very smooth, even, extremely glossy |
| 2 | D | 0.00 | 8 | Very smooth, even, very glossy |
| 3 | A | +0.19 | 10 | Very smooth, even, extremely glossy |
| 4 | C | +0.22 | 6 | Smooth, even, glossy |
| 5 | D | −0.28 | 7 | Very smooth, even, very glossy |
| 6 | F | −0.37 | 6 | Flat, smooth, even, glossy |
| 7 | H | −0.24 | 5 | Smooth, fairly even, fairly glossy |
| 8 | G | +0.22 | 6 | Smooth, even, very glossy |
| 9 | J | +0.52 | 7 | Smooth, even, slight surface ripple, extremely glossy |
| 10 | I | −1.78 | 0 | Badly rippled surface, very uneven, moderate gloss |

Note: A positive dimensional change indicates expansion
Note: Surface quality is a visual assessment expressed numerically on a scale of 0 (very poor) to 10 (excellent)

EXAMPLE 11

| | |
|---|---|
| Amorphous Resin PD7670 - an amorphous urethane acrylate dissolved in styrene, commercially available from Scott Bader (101.4 g urethane acrylate + 65.6 g styrene) | 167.00 g |
| Styrene | 43.00 g |
| Saturated crystalline polyester of Example E | 40.00 g |
| Millicarb | 475.00 g |
| Grade D Powder (a commercially available China Clay supplied by English China Clays Limited) | 25.00 g |
| Zinc Stearate | 15.00 g |
| Trigonox 29B50 | 3.75 g |

This mixture was converted to a sheet moulding compound exactly as described in Examples 1 to 10. The characteristics of the moulding compound were as in Examples 1 to 8. The resulting compound was moulded for 3 minutes at 160° C. and at pressure of 1200 psi (8.3

MPa.) as for the preceding examples, and the dimensional change measured as before.

The mouldings produced showed a dimensional change (linear shrinkage) of −0.40 parts per thousand, and had very flat, smooth, and even surfaces. The surface finish was slightly matt, producing well defined reflections only at low angles of incidence. Overall surface quality was assessed as 5.

EXAMPLE 12

| | |
|---|---|
| Amorphous Resin PD7447 - an amorphous urethane modified vinyl ester dissolved in styrene, commercially available from Scott Bader (98.8 g vinyl ester + 91.2 g styrene) | 190.00 g |
| Styrene | 20.00 g |
| Saturated crystalline polyester of Example D | 40.00 g |
| Millicarb | 475.00 g |
| Grade D Powder | 25.00 g |
| Zinc stearate | 15.00 g |
| Trigonox 29B50 | 3.75 g |

This mixture was converted to a sheet moulding compound, and subsequently moulded into plaques, exactly as for Example 11. The characteristics of the moulding compound were as for Examples 1 to 8, 10 and 11.

The dimensional change (linear shrinkage) of the resulting mouldings was −1.20 parts per thousand. The surfaces of the mouldings were extremely flat, very smooth and even, and fairly glossy. Overall surface quality was assessed as 5.

EXAMPLE 13

| | |
|---|---|
| Amorphous Resin - Derakane ™ 790 - an amorphous vinyl ester dissolved in styrent, commercially available from Dow Chemical Corporation (approx. 53% solids content) | 180.00 g |
| Styrene | 30.00 g |
| Saturated crystalline polyester of Example A | 40.00 g |
| Millicarb | 425.00 g |
| Grade D Powder | 25.00 g |
| Zinc Stearate | 15.00 g |
| Trigonox 29B50 | 3.75 g |

This mixture was converted to a sheet moulding compound as described for Examples 11 and 12, and similarly moulded into plaques for 3 minutes at 150° C. at a pressure of 1200 psi (8.3 MPa.) the dimensional change of the resulting mouldings being measured after equilibration at 25° C.

The resulting mouldings showed a dimensional change (linear expansion) of +0.20 parts per thousand. The surfaces were very flat, smooth and even with a very good gloss and a just perceptible short term ripple. Overall surface quality was assessed as 7.

EXAMPLES WITHOUT FILLER

Example 14

The following mixture was made by stirring together the amorphous resin, crystalline resin, and styrene at a temperature of 80° C. When the resin had completely dissolved, zinc stearate was added under high shear mixing. Finally the catalyst was dispersed with more gentle stirring.

| | |
|---|---|
| Amorphous Resin of Example X [Amorphous Polyester X (163.2 g) in styrene (76.8 g)] | 240 g |
| Saturated crystalline polyester of Example E | 120 g |
| Styrene | 40 g |
| Zinc stearate | 30 g |
| Trigonox 29B50 (catalyst) | 6 g |

The resulting mixture was then impregnated at 70° C. into 2 layers of 800 g/sq m plain weave woven glass roving. The resulting composition was sandwiched between two nylon carrier films. A composite was produced with a glass content of 63%.

Comparative Example 15

A composite was produced by the same method as described in Example 14, except that the saturated crystalline polyester was replaced by the unsaturated crystalline polyester of Example I.

Moulding characteristics of Examples 14 to 15

The composites were allowed to cool to room temperature and left to stand overnight. Both materials had by then thickened to a readily handleable sheet from which the nylon carrier films could be cleanly stripped. Moulding charges were cut to the exact dimensions of the mould (102 by 267.5 mm) with the direction of the reinforcing fibres at 45 degrees to the long mould axis. The charge weight of 205 g (within 10 g) was achieved by stacking 3 charges together. Each full charge weight was then pressed for 5 minutes at 150° C. at a pressure of 1200 psi (8.3 MPa), to form plaques of 3.6 mm thickness, as described in Examples 1 to 13.

The resultant mouldings were assessed by examination of linear dimensional change, surface finish, and warpage. The results are summarised below:

| | Example 14 | Example 15 |
|---|---|---|
| Linear Dimensional Change.* | +0.4 parts/1000 | +0.4 parts/1000 |
| Surface Finish. | Smooth and even to the touch | Rough, underlying glass pattern easily felt. |
| Warpage (distortion). | Maximum of 0.25 mm on plaque diagonal | Maximum of 1.50 mm on plaque diagonal. |

*In systems of such high glass content, the reinforcement is the dominant factor in providing dimensional control, but the saturated crystalline polyester is the dominant factor in providing the excellent surface finish.

APPENDIX 1

Test Methods

Molecular Weight

A Knauer Vapour Pressure Osmometer was used to determine number average molecular weight.

Four concentrations of each resin (7–30 g/Kg) in dichloromethane were measured at 27° C. Calibration was made against a polystyrene standard (Waters Associates Standard No 26971, Mn=1,950).

Melt Viscosity

An ICI Cone and Plate Viscometer, made by Research Equipment (London) Ltd, was used.

Most determinations were made at 125° C., but if the full scale measurement of 40 p (4 Pa.s) was exceeded then the temperature was raised to 150° C.

Solubility in Styrene

Equal weights of crystalline resin and styrene (8 g total), contained in a 19 mm by 150 mm glass test tube, were immersed in a bath of boiling water. The mixture was allowed up to 30 minutes to dissolve with occasional stirring.

Assuming a solution at 100° C., the tube was transferred and the contents immersed in a water bath set at 30° C. With occasional stirring the solution was allowed up to 60 minutes to crystallise into a stiff paste or solid.

Melting Point

A Stanton Redcroft Model 671 Differential Thermal Analyser was heated at 20° C./min from room temperature to 200° C. 1.5 mg of sample was contained in an aluminium open crucible, an empty crucible being located on the reference thermocouple.

Melting point was recorded as corresponding to either the temperature of the endotherm peak or, in the case of multiple endotherms, the highest endotherm peak. The recorded temperature coincided with the formation of an optically clear, homogeneous liquid.

I claim:

1. A moulding composition comprising a fibrous reinforcement, an ethylenically unsaturated, essentially amorphous polymer, a cross-linking agent copolymerizable therewith and, as a thickener and low profile/shrinkage control agent, a crystalline polyester containing no ethylenic unsaturation, the amorphous polymer being selected from ethylenically unsaturated polyesters, vinyl ester polymers and urethane acrylate polymers, and the crystalline polyester
    (a) having a number average molecular weight of from 800-4,000 exclusive,
    (b) having a melting point within a range of from 50°-140° C. inclusive,
    (c) being soluble in an equal weight of styrene at 100° C. and yet insoluble therein at 30° C., and
    (d) being present in the composition in an amount, by weight of the total weight of the amorphous polymer, cross-linking agent and crystalline polyester, of from 5 to 50% inclusive.

2. A moulding composition according to claim 1, wherein the crystalline polyester has a melt viscosity within a range of from 1 p (0.1 Pa.s) at 125° C. to 40 p (4 Pa.s) at 150° C.

3. A moulding composition according to claim 1, wherein the crystalline polyester has a melting point of from 60°-120° C.

4. A moulding composition according to claim 1, wherein the said amount of the crystalline polyester is from 10-40% inclusive.

5. A moulding composition according to claim 1, wherein the crystalline polyester has a glycol component derived from at least one of ethylene glycol, propylene glycol, 1,4-butanediol, 1,6-hexanediol, diethylene glycol and 1,4-cyclohexanedimethanol.

6. A moulding composition according to claim 1, wherein the crystalline polyester has a glycol component derived from at least two glycols.

7. A moulding composition according to claim 1, wherein the crystalline polyester has an acid component derived from at least one of adipic acid, succinic acid, azelaic acid, terephthalic acid and isophthalic acid, and reactive derivatives of said acids.

8. A moulding composition according to claim 1, wherein the crystalline polyester has an acid component derived from at least two saturated dibasic carboxylic acids.

9. A moulding composition according to claim 1, wherein the crosslinking agent is a vinyl monomer.

10. A moulding composition according to claim 9, wherein the vinyl monomer is selected from styrene, vinyl toluene, p-methyl styrene, chlorostyrene, t-butyl styrene, methyl methacrylate, a glycol diacrylate and diallyl phthalate.

11. A moulding composition according to claim 10, wherein the vinyl monomer is styrene.

12. A moulding composition according to claim 1, which is a sheet moulding compound.

13. A moulding composition according to claim 1, which additionally contains a filler.

14. A moulding composition according to claim 1, which contains, as an additional thickener, a crystalline ethylenically unsaturated polyester.

15. A moulding composition according to claim 1, which contains an additional agent selected from low profile and shrinkage control agents.

* * * * *